United States Patent [19]

Kaneko

[11] Patent Number: 4,868,642
[45] Date of Patent: Sep. 19, 1989

[54] APPARATUS FOR DISPLAYING AN IMAGE ON A VIDEO MONITOR CORRESPONDING TO AN IMAGE BEING PHOTOGRAPHED

[75] Inventor: Kiyotaka Kaneko, Tokyo, Japan

[73] Assignee: Fuji Photo Film Co., Ltd., Kanagawa, Japan

[21] Appl. No.: 195,024

[22] Filed: May 17, 1988

[30] Foreign Application Priority Data

May 18, 1987 [JP] Japan ................................. 62-119110

[51] Int. Cl.$^4$ ......................... H04N 5/30; G03F 3/08
[52] U.S. Cl. ....................................... 358/76; 358/909
[58] Field of Search ............ 358/76, 209, 229, 213.13, 358/224, 909; 354/76

[56] References Cited

U.S. PATENT DOCUMENTS 4,689,696  8/1987  Plummer ............................. 358/909
4,692,797  9/1987  Matsumoto ........................... 358/76
4,716,470 12/1987  Levine ................................. 358/76
4,742,369  5/1988  Ishii et al. ........................... 358/909

Primary Examiner—Jin F. Ng
Assistant Examiner—Stephen Brinich
Attorney, Agent, or Firm—Birch, Stewart, Kolasch & Birch

[57] ABSTRACT

A video camera is arranged adjacent to a master camera with a silver halide film so as to pick up an image of the same subject as that to be taken by the maser camera. The video signals of a plurality of fields supplied from the video camera are stored in a memory. The video signals of fields of a predetermined number corresponding to the memory capacity are stored in such manner that a new input video signal is stored with erasing the oldest video signal stored therein. The video signal delayed by a predetermined fields from the oldest video signal stored in the memory is read out to supply the read out signal to a video monitor device. Responsive to a full-open signal input of a shutter in the master camera during a period after resetting, the storing operation is stopped at a predetermined timing around the input of the full-open signal, and specified video signals are read out from the memory other than that of the field for the full-open signal to send the read out signal to the video monitor device for displaying a still image.

5 Claims, 3 Drawing Sheets

APPARATUS FOR DISPLAYING AN IMAGE ON A VIDEO MONITOR CORRESPONDING TO AN IMAGE BEING PHOTOGRAPHED

BACKGROUND OF THE INVENTION

The present invention relates to a still image recording apparatus that is convenient for photo studio use.

For photographing at a studio for business and commercial usages, a large-sized camera (master camera) with 120 or 220 roll films or sheet films is generally used. At the photo studio, the same image as the image seen through the finder is reproduced on the finished photo for a still subject. On the other hand, when photographing a moving subject such as a person, it is impossible to confirm the image which will be reproduced on the film at the time of photographing. A plurality of photos are therefore taken with changing the photographing angles and poses for subsequent developing. A favorite photo is thereafter selected and enlarged from among the plurality of photos.

As described above, when photographing a person by the master camera at the photo studio, it is impossible to remember the image now being photographed.

Accordingly, the client has to select a favorite photo from among a plurality of enlarged photos. This presents the problem that the client must frequently come to the photo studio.

SUMMARY OF THE INVENTION

It is, therefore, an object of the present invention to provide a still image recording apparatus which contributes greatly towards constructing a system capable of prompt visual confirmation of the image taken by the master camera using a silver halide film.

According to one embodiments of the present invention, an image of the subject to be taken by a master camera using a silver halide film is picked up by a video camera. The video signal obtained by the video camera is supplied to a video monitor device through a still image recording apparatus. When photographing by the master camera, the image to be displayed on the video monitor device is fixed and the same image is continuously displayed by the still image recording apparatus.

According to another embodiment of the present invention, a video camera is arranged adjacent to a master camera using a silver halide film to pick up an image of the same subject as the image photographed by the master camera. The video signals of a plurality of fields supplied from the video camera are stored in a memory. The video signals of a predetermined number of fields corresponding to the memory capacity are stored so that a new input video signal is stored by erasing the oldest video signal stored in the memory. The video signal is delayed by predetermined fields from the oldest video signal stored in the memory and the video signal is read out to supply the read out signal to a video monitor device. Responsive to an input of a full-open signal of a shutter in the master camera during a period after resetting, the storing operation is stopped at a predetermined timing around the input of the full-open signal, and specified video signals are read out from the memory other than the video signal of the field for the full-open signal to send the read out signal to the video monitor device for displaying a still image.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENT

An embodiment of the present invention will be described with reference to the drawings.

Figure 1:
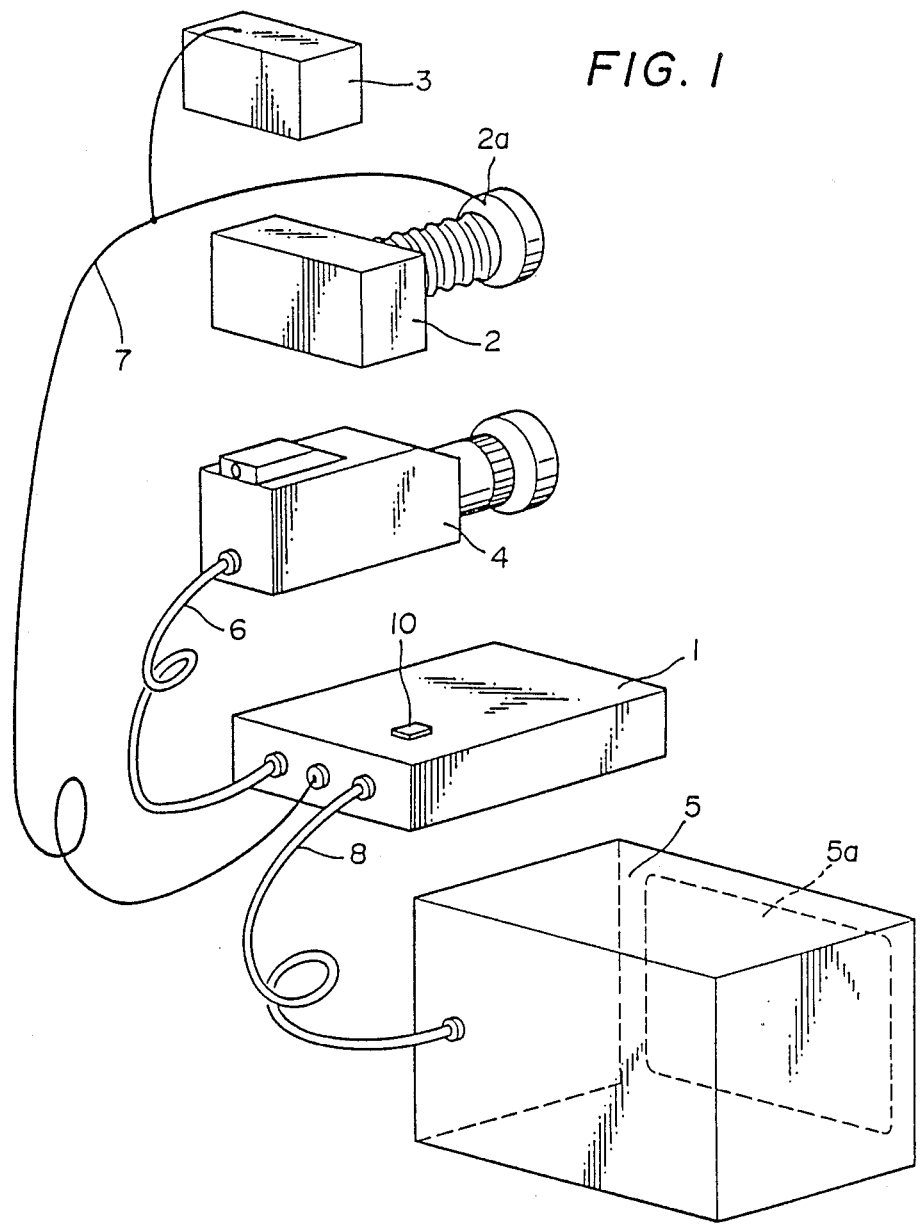
FIG. 1 shows a constructional view representing a photographing system according to one embodiment of the present invention.

FIG. 1 represents a system construction of one embodiment of the present invention. In FIG. 1 a still image recording apparatus a large-sized camera (master camera) 2, a strobo 3, a colour video camera 4, and a colour monitor television 5 are shown.

The colour video camera 4, is arranged adjacent to the master camera 2, picks up a subject image (for example, a person) and supplies the video signal to the still image recording apparatus 1 through a cable 6. At the full-open time of the shutter that is responsive to the shutter release of the master camera 2, a strobo synchronous signal is generated from a synchro-contact 2a of the master camera 2. Upon receipt of this strobo synchronous signal through a wire 7, the strobo 3 emits light in synchronism with the full-open of the master camera 2. The strobo synchronous signal is also fed to the still image recording apparatus 1. The still image recording apparatus 1 determines whether the shutter in the master camera 2 is fully opened on the basis of the strobo synchronous signal and thereafter performs the following operations. The still image recording apparatus 1 is provided with a reset switch 1a and is coupled with the colour monitor television 5 through a cable 8. The colour monitor television 5 is arranged such that the television display 5a faces towards the subject (person).

Figure 2:
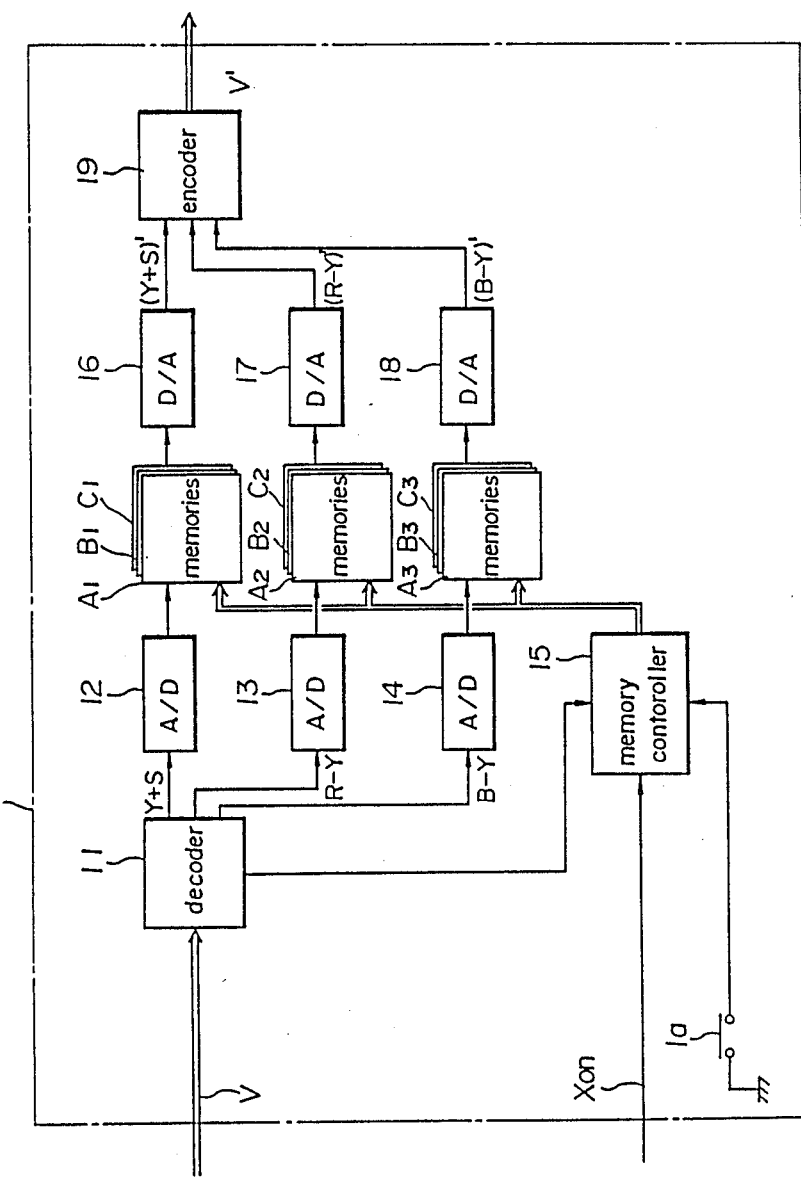
FIG. 2 shows a block diagram of the still image recording apparatus according to a second embodiment of the present invention.

Next, the inside construction of the still image recording apparatus 1 will be explained with reference FIG. 2. A decoder 11 separates a composite video signal V supplied from the colour video camera 4 into a luminance signal (including the synchronous signal) (Y+S), a colour difference signal (R−Y) and a second colour difference signal (B−Y). A/D converters 12, 13 and 14 convert the separated signals (Y+S), (R−Y) and (B−Y) into respective digitized signals. The digitized signals are stored in memories A1, A2, A3, B1, B2, B3, C1, C2 and C3 which placed in the writing state by a memory controller 15. In response to an instruction from the memory controller 15, the digital signals are read out from the memories A1, A2, A3, B1, B2, B3, C1, C2 and C3. The digital signals are subjected to D/A conversion by the D/A converters 16, 17 and 18 to develop the luminance signal (Y+S)′, a first colour difference signal (R−Y)′ and a second colour difference signal (B−Y)′. An encoder 19 encodes the analog signals (Y+S)′, (R−Y)′ and (B−Y)′ to form a video signal V′ the encoder 19 sends the video signal V′ to the colour monitor television 5. The memory controller 15 is supplied with the signals from the decoder 11, and the reset switch 1a and the strobo synchronous signal Xon from the master camera 2.

The operation of this embodiment will be explained by referring to FIGS. 1 and 2 together with FIG. 3 which indicates the signal waveforms.

Figure 3:
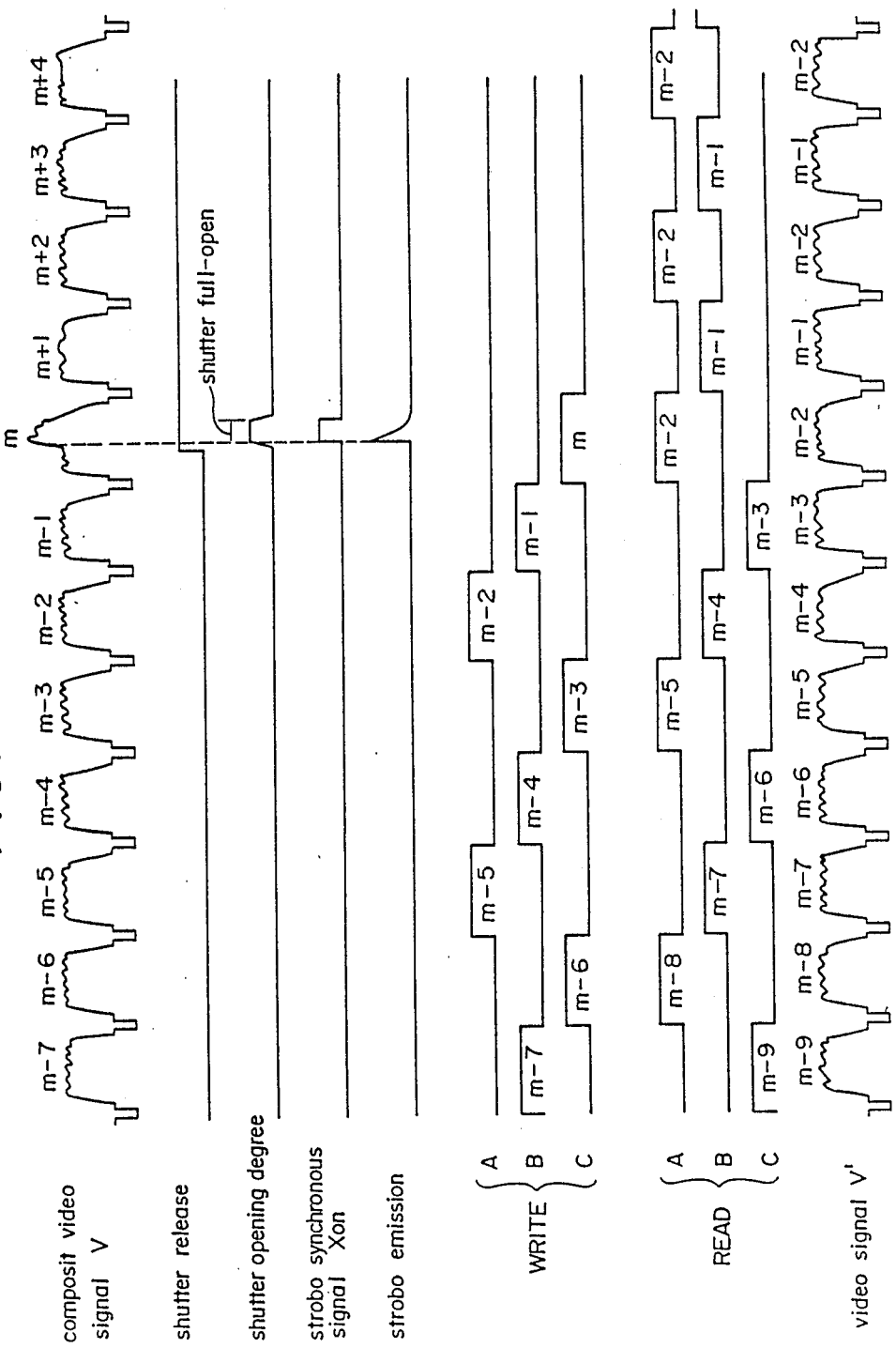
FIG. 3 shows signal waveforms for explaining the operation situation.

In FIG. 3, the shutter release is performed at the time of the m-th field in the composite video signal V. When the shutter of the master camera 2 is fully opened in response to the shutter release, the strobo synchronous signal Xon is outputted to make the strobo 3 emit. As a result of this strobo emission operation, the level of the composite video signal V of the m-th field becomes higher than the level of other fields.

By setting the reset switch 1a, the still image recording apparatus 1 is placed in a reset state. In response to the input of the composite video signal V from the colour video camera 4 under the reset state, the memory A representing the memories A1, A2 and A3, the memory B representing the memories B1, B2 and B3, and the memory C representing the memories C1, C2 and C3 are write/read-controlled by the memory controller 15.

First, the write-control will be described. According to the control by the memory controller 15, the video signals of three fields are stored by storing a new input video signal which erases the oldest video signal stored in the memories A, B and C. More specifically, the video signal of the (m−7)th field in the composite video signal is A/D-converted and the converted signal is stored in the memory B. Similarly, the video signals of the (m−6)th and (m−5)th fields are A/D-converted and the converted signals are stored in the memories C and A, respectively. Responsive to the input of the video signal of the (m−4)th field, the video signal of the last time (m−7)th field stored in the memory B is erased and the video signal of the present time (m−4)th field is stored therein. The video signal of the (m−)th field is likewise stored in the memory C by erasing the video signal of the (m−6)th field stored therein and the video signal of the (m−2)th field is stored in the memory A by erasing the video signal of the (m−5)th field stored therein. This write-control continues until the shutter release is performed.

Next, the read-control will be described. The video signals delayed by the two fields from the oldest video signal stored in the memories A, B and C are first read out. In particular, when the (m−7)th field video signal is stored in the memory B, the (m−9)th field video signal is read out from the memory C. When the (m−6)th and (m−5)th field video signals are respectively stored in the memories C and A, the (m−8)th and the (m−7)th field video signals are read out from the memories A and B, respectively. This read-control continues until the shutter release is performed. Thus, read-out video signal is D/A-converted and encoded by the encoder 19 for producing a video signal V'. The video signal V' is supplied to the colour monitor television 5 through the cable 8. Therefore, the posture and expression of a person being photographed may be checked by looking at one's figure that is displayed as the moving image on the image display 5a. Thereby, the image display 5a makes checking one's figure similar to looking in a mirror.

In response to the shutter release at the m-th field in the composite video signal V and the input of the strobo synchronous signal Xon to the still image recording apparatus 1, the still image recording apparatus 1 stops the writing operations into the memories A, B and C from the next field and read out alternatively and repeatedly the video signals of the (m−1)th and (m−2)th fields stored in the memories A and B. The video signals of the (m−1)th and (m−2)th fields are D/A-converted and the converted signals are encoded. The encoded video signal V' is sent to the colour monitor television 5 display the still image on the display 5a. This still image represents the subject just before the shutter release is performed. Namely, the display 5a provides almost the same still image as the image that is to be photographed by the master camera 2. As a result, it is possible to promptly confirm the image being photographed by the master camera 2.

Thereby, the reading out from the memory C is not carried out since the m-th field video signal of a high level corresponding to the strobo light is stored in the memory C.

It is to be noted that although the shutter full-open of the master camera is detected by the strobo signal of the master camera in the above embodiment, the shutter full-open may also be detected by a photo transistor and the like which detects the strobo light.

As particularly described in this embodiment of the present invention, the subject image may be displayed as the moving image on the video monitor device before the shutter is released. Thereby, almost the same image that is to be photographed by the master camera may be displayed as the still image on the video monitor device after the shutter is released. Therefore, it is very convenient for prompt confirmation of the photographing situation and the expression of the subject being photographed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A still image recording apparatus for controlling mutual operations of a master camera device using a silver halide film for photographing a subject image, a video camera device, arranged adjacent to said master camera, for filming the subject image and a video monitor device for viewing the subject image being filmed by the video camera device, the apparatus comprising:

memory means for storing video signals of the subject image corresponding to a plurality of fields supplied from the video camera device;

means for storing said video signals of a predetermined number of fields in said memory means so that a new input video signal is stored by writing over said video signals stored in said memory means;

means for reading out said video signals from said memory means before writing said new input video signal into said memory, said video signals being offset from said new input video signal by said predetermined number of fields;

means for supplying said video signals read out from said memory means to said video monitor device;

means for stopping said means for storing said video signals responsive to developing a full-open signal representing a full-open state of a shutter in said master camera for a period of time;

means for repeatedly reading out said fields of said video signals from the memory means other than one of said fields corresponding to said full-open signal; and means for sending said fields from said means for repeatedly reading out to said video monitor device.

2. A still recording apparatus comprising:

video camera means for recording a subject image and developing video signals of said subject image;

master camera means for photographing a still image of said subject image;

video monitoring means for displaying video signals from said video camera means; and video monitoring control means for controlling said video signals being displayed on said video monitoring means including, memory means for storing said video signals in a predetermined number of fields and storing new video signals in said memory means by writing over said fields of said video signals previously stored, reading means for reading said fields of said video signals from said memory means before storing said new video signals in said memory means and repeatedly reading said fields of said video signals other than of said fields corresponding to a full-open signal developed for a predetermined period of time in response to a full-open state of a shutter in said master camera means, and supplying means for supplying said fields of said video signals to said video monitoring means.

3. The still image recording apparatus of claim 2, wherein said memory means comprises a plurality of memory portions.

4. The still image recording apparatus of claim 2, wherein said master camera means uses silver halide film.

5. A method for controlling a display subject image being photographed by a master camera on a video monitor device, comprising the steps of:

storing video signals corresponding to the subject image in a predetermined number of fields of a memory;

reading said video signals from said memory for display on the video monitor device;

writing new video signals of the subject image over said video signals previously stored in said fields of said memory;

displaying said video signals previously stored on the video monitor device;

photographing the subject image in response to a full-open state of a shutter in the master camera;

preventing said writing of said new video signals into said memory for a predetermined period of time;

repeatedly reading said fields of said video signals from said memory other than one of said fields corresponding to said full-open state for said predetermined period of time; and displaying said fields repeatedly read from said memory on the video display device.

* * * * *